UNITED STATES PATENT OFFICE.

WILLIAM B. BRITTINGHAM, OF LA FAYETTE, INDIANA.

IMPROVEMENT IN TANNING COMPOSITIONS.

Specification forming part of Letters Patent No. 109,714, dated November 29, 1870.

*To all whom it may concern:*

Be it known that I, WILLIAM B. BRITTINGHAM, of La Fayette, in the county of Tippecanoe and State of Indiana, have invented certain Improved Compositions for Removing Hair from Skins and Tanning Leather, of which the following is a specification:

This invention relates, first, to a composition of ingredients for preparing skins of animals for the ready removal of the hair therefrom, and, secondly, in a composition for tanning the skins after the hair has been removed; and this invention consists, first, in a composition consisting of the following-named ingredients, and substantially in the proportions hereinafter named: potash, three ounces; nitrate of potassa, one ounce; common salt, three ounces; common lime, twenty ounces; water, ten gallons. The above-named quantities are for the number of gallons named; but the same proportions may be used for any greater or lesser quantity. This composition is placed in any suitable vat or other receptacle, and the skins, with the hair upon them, are to be immersed therein, and allowed to remain until they are "struck through," when they are ready for the removal of the hair. After the hair has been removed, the skins are treated in any of the methods in use for preparing them for tanning.

The second part of my invention consists in a composition for tanning leather, it being composed of the following-named ingredients, and substantially in the proportions named: To a strong decoction of bark, japonica, gambier, or cutch I add potash or carbonate of potassa, two ounces; nitrate of potassa, four ounces; alum, two ounces; sulphate of zinc, one ounce; water, ten gallons. Any quantity of the above-named composition may be prepared and placed in any suitable receptacle, and the skins placed therein, after which they are to be treated in the usual way, they being allowed to remain in the liquor or composition until the tanning process has been completed.

The advantage growing out of the use of the potash and nitrate of potassa in these compositions is, that they soften the skin by opening its pores, and thus prepare it for the reception of the tannin. It preserves the integrity of the fiber of the leather, and insures its remaining in a soft and pliable condition until it is worn out.

The effect of the use of alum and sulphate of zinc in the composition for tanning is to contract the pores of the leather after the potash and nitrate of potassa have entered them in sufficient quantities to insure the result above described.

Having thus described my invention, what I claim, and desire to secure by Letters Patent, is—

1. A composition for preparing skins for the removal of the hair therefrom, consisting of the following-named ingredients, and substantially in the following-named proportions: potash, three ounces; nitrate of potassa, one ounce; common salt, three ounces; lime, twenty ounces; water, ten gallons.

2. A composition for tanning leather, consisting of the following-named ingredients, and substantially in the following proportions: a strong decoction of bark, japonica, gambier, or cutch, added to potash or carbonate of potassa, two ounces; nitrate of potassa, four ounces; alum, two ounces; sulphate of zinc, one ounce; water, ten gallons.

In testimony whereof I have signed my name to this specification in the presence of two subscribing witnesses.

WILLIAM B. BRITTINGHAM.

Witnesses:
    D. P. HOLLOWAY,
    B. EDW. J. EILS.